United States Patent

Welter et al.

(10) Patent No.: US 6,810,787 B2
(45) Date of Patent: Nov. 2, 2004

(54) MASTER CYLINDER

(75) Inventors: Roland Welter, Bühl (DE); Peter Schaaf, Neustadt/Aisch (DE); Peter Giese, Herzogenaurach (DE); Ludwig Winkelmann, Erlangen (DE); Gerhard Meyer, Lehrberg (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 40 days.

(21) Appl. No.: 10/242,936

(22) Filed: Sep. 12, 2002

(65) Prior Publication Data

US 2003/0014970 A1 Jan. 23, 2003

Related U.S. Application Data

(62) Division of application No. 09/579,094, filed on May 25, 2000, now Pat. No. 6,470,791, which is a continuation of application No. PCT/EP98/06782, filed on Oct. 26, 1998.

(30) Foreign Application Priority Data

Nov. 25, 1997  (DE) .......................................... 197 52 076

(51) Int. Cl.[7] ................................................. F16J 1/14
(52) U.S. Cl. ...................................................... 92/188
(58) Field of Search ..................... 92/187, 188; 60/533; 403/76, 90, 114, 122, 123, 125, 130

(56) References Cited

U.S. PATENT DOCUMENTS

| | | | |
|---|---|---|---|
| 1,254,566 A | | 1/1918 | Bard |
| 1,413,645 A | * | 4/1922 | Sumner ........................ 92/187 |
| 1,543,498 A | | 6/1925 | Hammond |
| 1,866,057 A | * | 7/1932 | Reid ............................ 92/187 |
| 1,868,891 A | * | 7/1932 | Fritz ............................ 403/122 |
| 1,898,872 A | * | 2/1933 | Evanoff et al. ................ 92/186 |
| 2,100,642 A | | 11/1937 | Geyer |
| 2,451,216 A | | 10/1948 | Halfvarson |
| 2,856,250 A | * | 10/1958 | Johannes ....................... 403/9 |
| 2,933,357 A | | 4/1960 | Weltyk |
| 3,173,266 A | * | 3/1965 | Shutt .......................... 92/187 |
| 3,266,383 A | | 8/1966 | Cairns |
| 3,787,128 A | * | 1/1974 | Maistrelli .................... 91/488 |
| 3,941,493 A | * | 3/1976 | Lagnitre ...................... 91/499 |
| 4,650,363 A | | 3/1987 | Kehl et al. |
| 4,831,916 A | | 5/1989 | Leigh-Monstevens et al. |
| 4,895,472 A | * | 1/1990 | Dony et al. ................. 403/133 |
| 5,153,976 A | * | 10/1992 | Benchaar et al. ............. 29/436 |
| 5,367,945 A | * | 11/1994 | Halka et al. ................. 92/187 |
| 5,725,456 A | | 3/1998 | Fischer et al. |
| 5,794,512 A | | 8/1998 | Prosch et al. |

FOREIGN PATENT DOCUMENTS

| | | |
|---|---|---|
| DE | 19608132 | 5/1997 |
| EP | 0270285 | 6/1988 |
| FR | 2.101.999 | 3/1972 |
| FR | 2651838 | 9/1989 |
| GB | 2018876 | 10/1979 |
| JP | 355123010 | 9/1980 |

* cited by examiner

Primary Examiner—Edward K. Look
Assistant Examiner—Igor Kershteyn
(74) Attorney, Agent, or Firm—Darby & Darby (57) ABSTRACT

A master cylinder for the clutch or brake of a motor vehicle has a housing for a reciprocable piston one end of which receives the spherical head of a reciprocable piston rod. The head is held in a desired position relative to the piston by a one-piece or composite coupling device having a first section exerting a pull or bearing upon the head of the piston rod and a second section which is confined in or surrounds the end of the piston and urges the first section in a direction to hold the piston rod against axial movements relative to the piston. The coupling device and/or the piston are or can be made of a plastic material, and the connection between such parts is or can be established by snap action.

4 Claims, 6 Drawing Sheets

MASTER CYLINDER

CROSS-REFERENCE TO RELATED APPLICATIONS

This application is a divisional of U.S. patent application Ser. No. 09/579,094, filed May 25, 2000, which is a continuation of International application No. PCT/EP98/06782, filed Oct. 26, 1998, each of which is hereby incorporated by reference in its entirety.

BACKGROUND OF THE INVENTION

The invention relates to improvements in fluid-operated cylinder-and-piston assemblies in general, and more particularly to assemblies known as master cylinders. A master cylinder can be utilized, for example, in a motor vehicle where it can form part of a device such as a hydraulic brake or clutch.

As a rule, a master cylinder comprises a cylinder or housing defining a chamber for a reciprocable piston which can displace a column of liquid to thus actuate a brake or a clutch, e.g., by way of a so-called slave cylinder. "Modern Automotive Technology" (authored by James E. Duffy and published by The Goodheart-Willcox Company, Inc. of Tinley Park, Ill.) defines a master cylinder for a brake pedal assembly as a foot-operated pump that forces liquid into the brake lines and wheel cylinders. Its basic functions are to develop pressure, causing the wheel cylinder pistons to move toward rotors or drums; to help equalize the pressure required for braking after all of the shoes or pads produce sufficient friction; to keep the system full of fluid as the brake linings wear; and to maintain slight pressure to keep contaminants (such as air and/or water) from entering the system.

A master cylinder can be assembled with a brake pedal or with a clutch pedal to form part of a module which is ready to be installed in a motor vehicle, e.g., to apply brakes to the wheels or to engage or disengage a friction clutch. In many master cylinders, the brake pedal or clutch pedal is linked to a piston rod having a free end provided with a spherical head which is connected to and can swivel relative to the piston in the housing of the master cylinder. The module can be installed on a wall, e.g., between the space for the prime mover and the driver compartment. The piston can displace a column of liquid in order to cause the piston of a slave cylinder to expel liquid from the housing of the slave cylinder or to permit liquid to reenter the housing.

Reference may be had, for example, to published German patent application Serial No. 196 08 132 A1 which describes and shows a conventional master cylinder. The latter comprises a housing made of a plastic material and defining a chamber for a plastic piston. The piston rod of the master cylinder has a spherical head which is form-lockingly connected with the piston. To this end, the piston is provided with a socket having a recess bounded by a concave surace and serving to receive the head of the piston rod (reference may be had to FIG. 3 of the German published application). The piston is slotted axially in the region of the head of the piston rod so that the head can be readily introduced into the socket. A firm swiveling connection between the head of the piston rod and the piston is established by a sleeve which is slipped onto the slotted part of the piston so that the latter snugly surrounds the head and prevents separation of the spherical head from the piston.

A drawback of such master cylinders is that at least the slotted end of the piston and/or the head of the piston rod (also called push rod) must be made of a highly elastic material in order to permit the head of the piston rod to enter the cavity of the socket in the piston. As a rule, the head of the piston rod and/or the piston must be made of an elastomeric material, particularly a thermoplastic material which permits adequate deformation of the head and/or of the adjacent end of the piston and to thus permit insertion of the head into its socket. In many instances, the thermal expansion coefficient of a thermoplastic material is very high and actually too high because the stability of the piston is not sufficient for the intended purpose. In other words, the stability of the entire master cylinder is unsatisfactory for the intended purpose e.g., for use in a brake system or in combination with a clutch in the power train of a motor vehicle.

The manner in which an electronically controlled or operated master cylinder can regulate the operation of a clutch by way of a slave cylinder in the power train of a motor vehicle is described and shown, for example, in commonly owned U.S. Pat. No. 5,725,456 granted Mar. 10, 1998 to Robert FISCHER et al. for "METHOD OF REGULATING THE OPERATION OF A TORQUE TRANSMISSION APPARATUS". The disclosure of the commonly owned priority application Serial No. 197 52 076.6, as well as the disclosure of each U.S. and foreign patent and patent application identified in the specification of the present application are incorporated herein by reference.

OBJECTS OF THE INVENTION

An object of the present invention is to provide a master cylinder wherein the connection between the piston and the piston rod is more reliable than in heretofore known master cylinders.

Another object of the invention is to provide a relatively simple and inexpensive but highly reliable swivel joint between the piston and the spherical head of the piston rod or push rod in a master cylinder which is suitable for use in the power train between the prime mover (such as an internal combustion engine) and the wheels of a motor vehicle.

A further object of the invention is to provide a novel and improved arrangement which couples a female part to a spherical male part in such a way that the force with which a separation of the male part from the female part is opposed invariably exceeds a preselected lower threshold value irrespective of the orientation of male and female parts relative to each other.

An additional object of the invention is to provide a novel piston for use in the above outlined master cylinder.

Still another object of the invention is to provide a novel and improved reliable (but separable, if and when necessary) joint between the piston and the piston rod in the chamber of a housing forming part of a master cylinder for use in conjunction with the braking system or with a clutch in the power train of a motor vehicle.

A further object of the invention is to provide a master cylinder adapted to be utilized as a superior (e.g., longer-lasting) substitute for conventional master cylinders which are presently employed in the power trains of motor vehicles.

An additional object of the invention is to provide a master cylinder which constitutes a less expensive, more reliable, more compact and more readily assemblable and/or disassemblable substitute for presently known master cylinders.

Another object of the invention is to provide a novel and improved method of connecting the spherical head of a piston rod or push rod with the piston of a master cylinder.

Still another object of the invention is to provide a module wherein the piston and the spherical head of a piston rod are assembled with each other in a novel and improved way with freedom of swivelling movement relative to each other and in a condition of readiness for installation in the housing of a master cylinder for use in conjunction with the braking system or with a friction clutch in the power train of a motor vehicle.

A further object of the invention is to provide a module which forms part of a master cylinder and can be installed in the housing of a master cylinder in a simple and reliable manner, be it in conjunction with one or more brakes or in conjunction with a friction clutch.

An additional object of the invention is to provide a highly compact and lightweight master cylinder for use in the power train of a motor vehicle.

SUMMARY OF THE INVENTION

The invention is embodied in a cylinder and piston assembly, particularly in a master cylinder, which comprises a housing defining a chamber, a piston which is reciprocable in the chamber, a reciprocable piston rod including a spherical head extending into the chamber into engagement with one end of the piston, and means for articulately coupling the head to the one end of the piston. The coupling means includes a first section which engages the piston rod and a second section which is affixed to the piston.

The piston is or can be made of a plastic material, and at least a portion of the coupling means can consist of a metallic sheet material, i.e., such portion of the coupling means can constitute a suitably deformed sheet metal blank.

In accordance with a first embodiment of the invention, the first section of the coupling means can constitute a portion of a hollow sphere which surrounds and bears upon a portion of the head and has a central opening remote from the second section of such coupling means and surrounding a portion of piston rod. The piston rod further includes an elongated part having an end connected to (e.g., of one piece with) the spherical head; the first section of the coupling means surrounds the head at the end of the elongated part of the piston rod, and the second section can include a tubular portion surrounding the one end of the piston. The one end of the piston can be provided with a circumferentially complete or multiple-section external groove, and the second section of the coupling means can include at least one projection which extends into the groove to hold the coupling means against axial movement relative to the piston and/or vice versa. The first section of the coupling means can be provided with axially parallel slots alternating with prongs or arms which bear upon and bias the spherical head against the one end of the piston. The first section of the coupling means can be provided with an annular end portion which surrounds the aforementioned central opening and has a convex internal surface which is maintained in substantially linear contact with the head of the piston rod.

In accordance with another embodiment of the invention wherein the one end of the piston surrounds at least a major portion of but normally the entire head of the piston rod, the coupling means can include a substantially cup-shaped second section which comprises a tubular portion surrounding the one end of the piston and an annular end wall which surrounds the piston rod at the head. The one end of the piston has an external groove and the tubular portion of the second section has at least one projection extending into the groove. The first section of the coupling means is confined in the second section and includes a sleeve which reacts against the end wall of the second section and bears upon the head of the piston rod.

In accordance with still another embodiment of the invention, the coupling means can include or constitute a clip made of metallic wire or the like. For example, the first section of a clip which constitutes the coupling means can include prongs which abut the end face at the one end of the piston and engage the head of the piston rod, and the second section of such clip can include links which connect the prongs and are received in an internal groove of the one end of the piston. The first section of such clip can include two prongs and the second section can include two links which are received in the aforementioned groove by snap action to urge the two prongs against the end face of the one end of the piston and against the head of the piston rod.

Alternatively, a clip which constitutes or forms part of the coupling means can comprise two legs which flank the piston rod and bear upon the head to bias the head into a complementary socket in the one end of the piston. The second section of the coupling means embodying or constituting the clip is anchored in the one end of the piston by snap action. The one end of the piston can be provided with radially extending slots for the second section of the clip. The latter can be U-shaped and its legs can be provided with arcuate median portions which engage the head of the piston rod. The second section of such clip can include the first and second ends of the aforementioned legs and a web which connects the first ends of the legs to each other. The second ends of the legs can be provided with extensions in the form of teeth or the like which are received in complementary recesses machined or otherwise provided in the one end of the piston.

In accordance with a further embodiment of the present invention, the one end of the piston is provided with a channel (e.g., with an axial bore or hole) which receives the head of the piston rod. The coupling means is at least partially confined in the channel and includes a sleeve which surrounds the piston rod adjacent to the head of the latter; the sleeve has a radially outwardly extending first end portion which constitutes the second section of the coupling means and is recessed into the piston. An inwardly extending second end portion of the sleeve bears against the head of the piston rod and acts as the first section of the coupling means.

It is also possible to design the master cylinder in such a way that the head of the piston rod is at least partially but preferably fully confined in the one end of the piston and that the second section of the coupling means abuts the end face at the one end of the piston. The first section of such coupling means is or can be provided with prongs which are of one piece with the second section, which are anchored in the one end of the piston and which abut the head of the piston rod. The prongs can further serve as a means for centering the first section of the coupling means in the axial channel of the piston.

The first section of a further embodiment of the coupling means can be confined in the second section and can include a sleeve which reacts against the second section and bears upon the head of the piston rod to bias the head into an internal socket provided in the one end of the piston. At least a portion of such coupling means can consist of a plastic material and its first section can be provided with a concave surface which abuts and is complementary to a convex external surface of the head.

The first section of a modified coupling means can be of one piece with the second section; the first section of such coupling means abuts an end face at the one end of the piston and has a concave seat which surrounds the head of the piston rod. The second section of the coupling means has prongs which are externally adjacent the one end of the piston and have projections extending into complementary recesses of the one end of the piston.

In accordance with a further embodiment, the coupling means can comprise an elongated body which can resemble a bar confined in the one end of the piston. The second section of the coupling means constitutes a first part of the bar and is anchored in the piston, and the first section of the coupling means constitutes a second part of the bar and is anchored in the head of the piston rod. The one end of the piston is provided with internal tongs which engage the second section of the bar by snap action.

The one end of the piston can have a diameter smaller than that of an adjacent median portion of the piston. A portion of the coupling means is or can be mounted and configured in such a way that its surrounds the one end of the piston; such portion of the coupling means can include or constitute the second section.

The novel features which are considered as characteristic of the invention are set forth in particular in the appended claims. The improved master cylinder itself, however, both as to its construction and the mode of assembling its parts, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
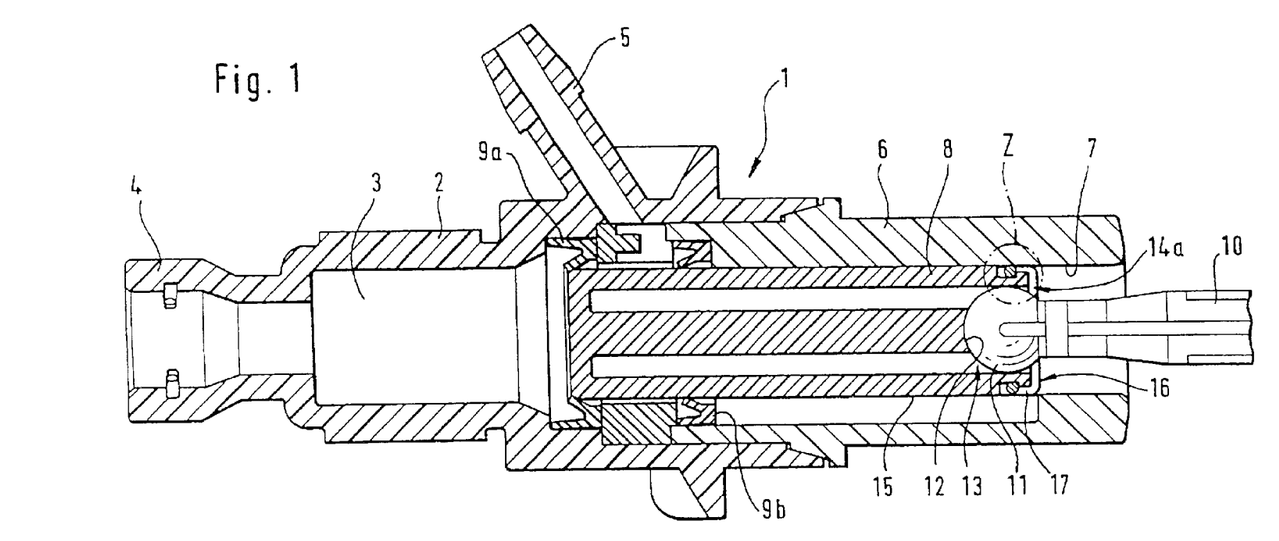
FIG. 1 is a fragmentary axial sectional veiw of a master cylinder wherein the spherical head of the piston rod is articulately connected with the adjacent end of the piston by coupling means embodying one form of the present invention and constituting a wire clip.

FIG. 1 shows a portion of a master cylinder 1 wherein two discrete sections or cups 2, 6 of a composite housing define a plenum chamber 3 for a reciprocable piston 8. The housing sections 2, 6 and the piston 8 are made of a plastic material, and the section 2 is provided with a nipple 5 constituting a fluid inlet and receiving (when necessary) a hydraulic fluid by gravity flow from a source, not shown, wherein the supply of fluid is maintained at or close to atmospheric pressure. An outlet 4 can deliver pressurized fluid to a user (not shown), such as the brake system or a clutch in the power train of a motor vehicle. The inlet 5 can admit hydraulic fluid from the source into the chamber 3 when the pressure in the chamber drops below the pressure in the source.

The right-hand part of the housing section 2 is enlarged and constitutes a cylindrical receptacle for the left-hand part of the housing section 6 which latter surrounds the piston 8. The sections 2, 6 of the housing are or can be permanently secured to each other, e.g., by resorting to a suitable adhesive or to an ultrasonic welding technique. The piston 8 is snugly but reciprocably received in the cylindrical axial passage 7 of the housing section 6 and can draw or permit the fluid to flow from the source, through the inlet 5, or expel pressurized fluid by way of the outlet 4.

The plenum chamber 3 is sealed from the passage 7 by two axially spaced-apart annular sealing elements 9a, 9b which flank the inlet 5.

One end portion of a push rod or piston rod 10 has a spherical head 11 extending into a complementary socket 12 in the adjacent end of the piston 8. The parts 11, 12 constitute a swivel joint 13. The right-hand end of the passage 7 in the housing section 6 is open and receives, with requisite clearance, that part of the piston rod 10 which is adjacent the head 11.

The coupling means 14a which articulately connects the head 11 of the piston rod 10 with the adjacent end of the piston 8 is constructed and installed and can operate in accordance with a first embodiment of the present invention. This coupling means 14a is constituted by a clip 16 which is made of metallic wire 17 and permits the head 11 to swivel in the complementary socket 12 of the piston 8. The material of the clip 16 is resilient so that the clip can engage the end portion of the piston rod 10 and/or the piston 8 by snap action.

Figure 1A:
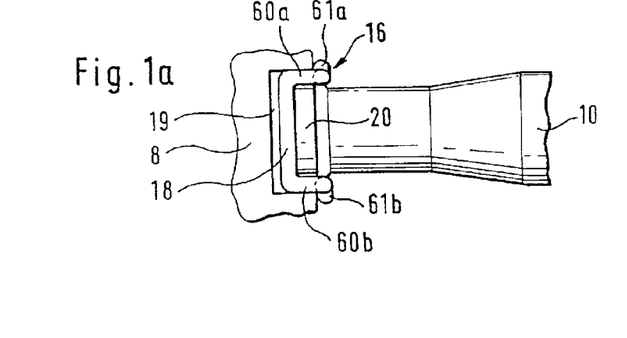
FIG. 1a is an enlarged view of a detail including the structure within the phantom-line circle Z shown in FIG. 1.

Certain details of the clip 16 and of the manner in which this clip couples the head 11 to the adjacent end of the piston 8 are shown in FIG. 1a. The prongs 61a, 61b of the clip 16 have arcuate portions which flank the piston rod 10 immediately behind or at the head 11 and preferably have arcuate median portions similar to those of the legs 43a, 43b shown in FIG. 9. Such arcuate median portions follow the outlines of the adjacent part of the piston rod 10 or its head 11; in addition, the prongs 61a, 61b abut the adjacent end face of the piston 8. The coupling means 14a (and more specifically the clip 16) comprises a first section which is constituted by the prongs 61a, 61b and serves to urge the head 11 against the socket 12 of the joint 13, and a second section which preferably releasably anchors the clip 16 in the adjacent end of the piston 8. The second section comprises links 60a, 60b which extend from the prongs 61a, 61b into a groove 19 in the peripheral surface 15 of the piston 8. The links 60a, 60b are connected to each other by portions or webs 18 of the clip 16. The portions 18 are anchored in the groove 19 adjacent a collar 20 provided on the piston rod 10 behind the head 11. The collar 20 serves as an abutment for the prongs 61a, 61b. The links 60a, 60b constitute the end portions of the respective prongs 61a, 61b.

The prongs 61a, 61b are or can be in mere linear contact with the head 11; this is desirable and advantageous in many instances because it entails a reduction of wear upon the clip 16 as well as upon the head 11. The connection between the head 11 and the first section (prongs 61a, 61b) of the clip 16 (i.e., of the coupling means 14a) is a so-called form-locking connection, and the second section 60a, 18, 60b of the clip 16 engages the end of the piston 8 (in the recess 19) by snap action. Such second section also engages the extension 20 of the piston rod 10.

The piston 8 can be made of a thermoplastic or a thermosetting plastic material, preferably a phenolic resin reinforced by suitable filler or fillers so that its strength matches or approximates that of aluminum. Another advantage of such plastic material is its pronounced resistance to wear as well as its ability to prevent undesirable (untimely) separation of the piston rod 10 from the piston 8. All this contributes to stability and reliability of the master cylinder 1.

The illustrated socket 12 can be replaced with a much larger socket, for example, with a socket which receives one-half of the spherical head 11.

The introduction of a portion of the head 11 into the socket 12 of the thus obtained joint 13 can immediately precede the mounting of the clip 16 in such a way that the first section 61a, 61b of the clip form-lockingly engages the piston rod 10 to bias the head 11 against the concave surface in the socket 12 as soon as the second section 60a, 18, 60b of the clip 16 engages the end of the piston 8 by snap action. The force which is being applied to the head 11 by the prongs 61a, 61b acts in the direction of the common axis of the piston 8 and housing section 6 and suffices to maintain the joint 13 in the assembled condition shown in FIG. 1, namely in a condition in which the spherical external surface of the head 11 bears upon the complementary concave surface in the socket 12 without any or without any appreciable play.

The piston 8 can be mass-produced in a suitable machine, e.g., in an injection molding machine. Such mode of making the piston exhibits the advantage that the piston is ready for use without any secondary treatment, and this contributes to lower cost of the piston and of the entire master cylinder 1. Even the surface bounding the recess or groove 19 and/or the end face which abuts the prongs 61a, 61b need not undergo any secondary treatment if the piston 8 is made in an injection molding machine.

The master cylinder 1, and particularly its piston 8 and the coupling means 14a (including the clip 16) can be modified in a number of ways without departing from the spirit of the invention. For example, the clip 16 can be installed in such a way that its first section cannot come into direct contact with the head 11 and/or with other parts of the piston rod 10. This can be achieved by resorting to a ring-shaped or tubular washer which is installed between the end face of the piston 8 and the prongs 61a, 61b and/or between such prongs and the head 11 to thus prolong the useful lives of the parts 8 and 14a. Additional inserts can be provided between the piston 8 and the second section 60a, 18, 60b of the clip 16. The wire 17 of the clip 16 can be made of or coated with a highly wear-resistant material; for example, the clip 16 can be made of spring steel. The configuration(s) of that additional part or those additional parts which is or are interposed between the head 11 and the coupling means 14a is or are preferably such that each part contacting the head has a surface complementary to the spherical surface of the head. As a rule, each additional part is or can be made of a suitable plastic material which may but need not be the same as that of the piston. All that counts is to select the material(s) and the configuration(s) of the additional part(s) in such a way that the wear upon the piston 8 and upon he piston rod 10 (including the head 11) is reduced as much as possible in order to prolong the useful life of the master cylinder. If an additional part is a ring which transmits force from the first section of the selected coupling means to the head of the piston rod and thence to the socket of the piston, the ring can be made of an elastomeric material and can be installed in stressed condition to urge the head 11 against the socket 12 without play. This can be achieved, for example, by employing a relatively thick ring which is compressed when the coupling means connects the piston rod with the piston.

Figure 2:
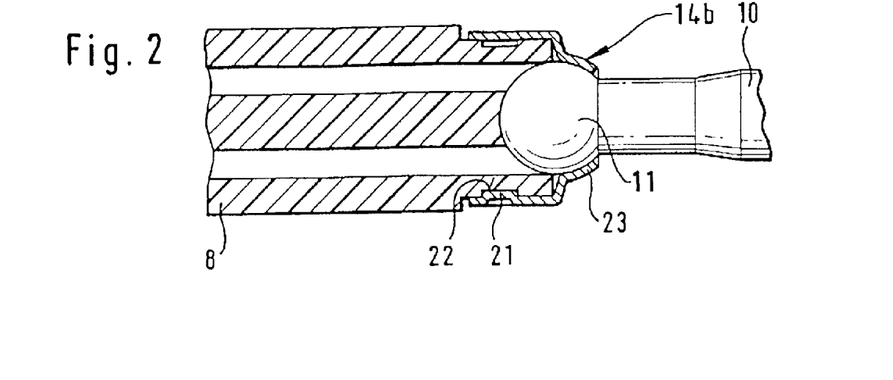
FIG. 2 is a fragmentary axial sectional view of a piston, a fragmentary elevational view of a piston rod and an axial sectional view of a coupling means made of sheet metal and configured and mounted in accordance with a second embodiment of the invention.

The piston 8 of FIG. 2 is similar to the similarly referenced piston of FIGS. 1 and 1a. The piston rod 10 of FIG. 2 is different from the piston rod of the master cylinder 1 shown in FIGS. 1 and 1a because it need not be provided with a collar 20. The coupling means 14b of FIG. 2 is made of a metallic sheet material and includes a hollow spherical first section 23 which surrounds a portion of the head 11 in a region immediately adjacent the non-spherical part of the piston rod 10, and a tubular second section 21 which surrounds the adjacent end of the piston 8 and has one or more projections (e.g., in the form of one or more beads or a circumferentially complete internal rib) received by snap action in the complementary recess or recesses 22 in the peripheral surface of the piston.

The piston 8 includes an end portion having a first outer diameter and being surrounded by the tubular second section 21 of the coupling means 14b, and a median portion having an outer diameter exceeding that of the end portion and being slidably received in the housing section 6 (not shown in FIG. 2) of the master cylinder including the structure of FIG. 2. In this respect, the configurations of the pistons 8 shown in FIGS. 1, 1a, 3, 5, 6, 12 and 14 are similar to that of the just described piston of FIG. 2.

The configuration of the internal surface of the first section 23 is complementary to that of the adjacent portion of the head 11.

Figure 3:
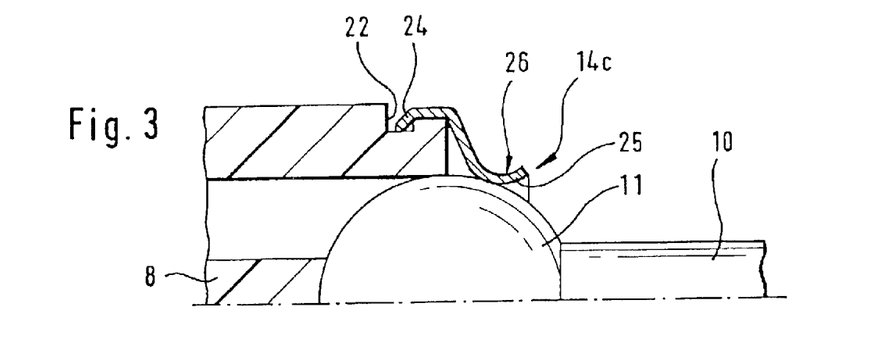
FIG. 3 is a view similar to that of FIG. 2 but showing a modified coupling means having a section which is in mere linear contact with the spherical head of the piston rod.

A difference between the structures shown in FIGS. 2 and 3 is that the first section 23 of the coupling means 14b has a concave surface confronting and contacting the adjacent portion of the external surface of the head 11, whereas the coupling means 14c of FIG. 3 comprises a first section 26 having a concave internal surface 25 in mere or in substantially linear contact with the spherical surface of the head 11 shown in FIG. 3. The second section 24 of the coupling means 14c is tubular and comprises a radially inwardly bent end portion which is received in the circumferential groove 22 provided in the end of the piston 8. The tubular second section 24 of the coupling means 14c does not extend radially outwardly beyond the larger-diameter median or main part of the piston 8 shown in FIG. 3.

The first section 26 of the coupling means 14c has a central opening 25 which spacedly surrounds the adjacent portion of the head 8. The section 26 is provided with at least one but preferably two or more axially parallel slots (not shown in FIG. 3) which alternate with prongs or tongues bearing against the adjacent portions of the external surface of the head 11 to thus couple the piston rod 10 to the piston 8 by snap action. Analogous axially parallel alternating slots and tongues or prongs are provided in the first section 23 of the coupling means 14b shown in FIG. 2.

The coupling means 14b and/or 14c can be produced of sheet metal in a deep drawing machine. This contributes to a reasonable cost of such coupling means. An advantage of the first section 26 over the first section 23 is that the section 26 can be more readily slipped onto the head 11. On the other hand, the first section 23 is in larger (surface-to-surface rather than substantially linear) contact with the head 11.

Figure 4:
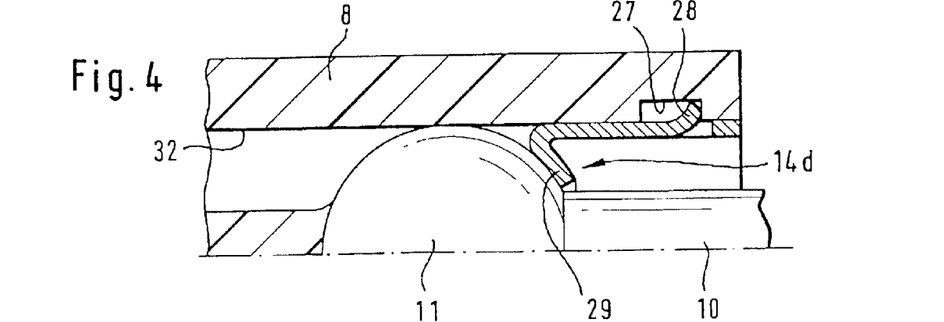
FIG. 4 is a fragmentary axial sectional view of a piston, a fragmentary elevational view of a piston rod having a spherical head which is confined in the adjacent end of the piston, and a fragmentary axial sectional view of coupling means which is also confined in the piston.

The master cylinder embodying the structure of FIG. 4 departs from those embodying the structures shown in FIGS. 1, 1a, 2 and 3 in that the entire coupling means 14d is confined in the axial channel or passage 32 of the piston 8. The first section 29 of the coupling means 14d (which can be made of a metallic sheet material) has a concave surface which bears upon the adjacent portion of the spherical surface on the head 11 adjacent the non-spherical part of the piston rod 11. The sleeve-like second section 28 of the coupling means 14d is snugly received in the axial channel 32 and has one or more radially outwardly extending portions received by snap action in an internal groove 27 provided in the respective end of the piston 8 shown in FIG. 4. The coupling means 14d can be said to constitute a sleeve or tube one end portion of which constitutes the first section (serving to bias the head 11 against the internal socket of the piston 8, and the other end portion of which comprises or constitutes the second section which is anchored in he end of the piston (i.e., in the internal groove 27) by snap action. The arrangement can but need not be such that each radially outwardly extending portion of the second section 28 fills the corresponding part of the internal groove 27, i.e., that the connection between the second section 28 and the piston 8 is a form-locking connection.

Figure 5:
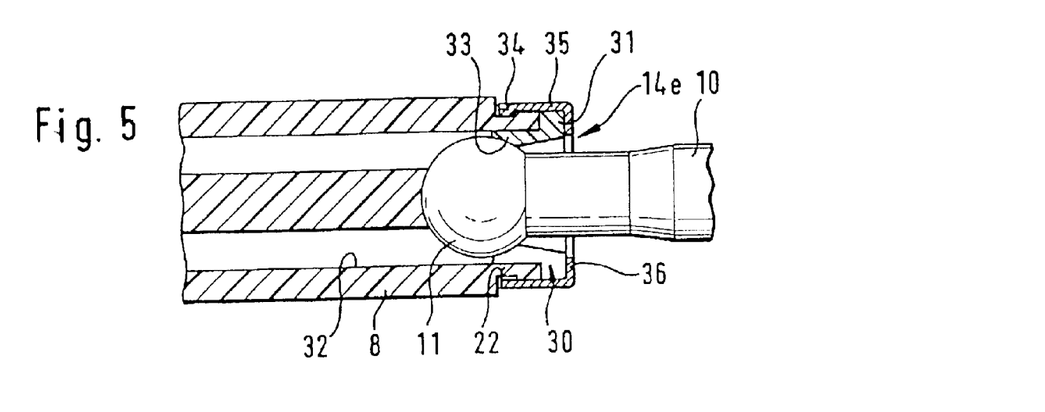
FIG. 5 is a view similar to that of FIG. 4 but showing modified coupling means which urges the spherical head of the piston rod into a complementary socket in the adjacent end of the piston.

The head 11 of the piston rod 10 shown in FIG. 5 is caused to bear against a concave internal surface in the channel 32 of the piston 8 under the action of a first section 30 forming part of the coupling means 14e and having a concave annular surface 33 bearing against the external surface of the head 11 adjacent the nonspherical part of the piston rod 10. That end portion (31) of the first section 30 which is remote from the concave surface 33 constitutes a composite ring which reacts against the adjacent internal surface of a radially extending annular end wall 36 forming part of a cup-shaped second section 35 having one or more radially inwardly extending projections 34 received by snap action in the external groove 22 machined into or otherwise provided in the external surface 22 of the end of the piston 8.

The aforementioned ring-shaped portion 31 of the first section 30 is confined between the end wall 36 and the end face of the piston 8. The section 30 is slotted and, when its portion 31 is properly received between the end wall 36 and the end face of the piston 8, the section 30 is centered in the channel 32 and the surface 33 maintains the head 11 in optimal contact with the concave surface forming part of the socket in the piston 8. The slot in the section 30 is preferably a meandering slot. The first section 30 is made of a plastic material and the second section 35 is or can be made of a metallic sheet material.

Figure 6:
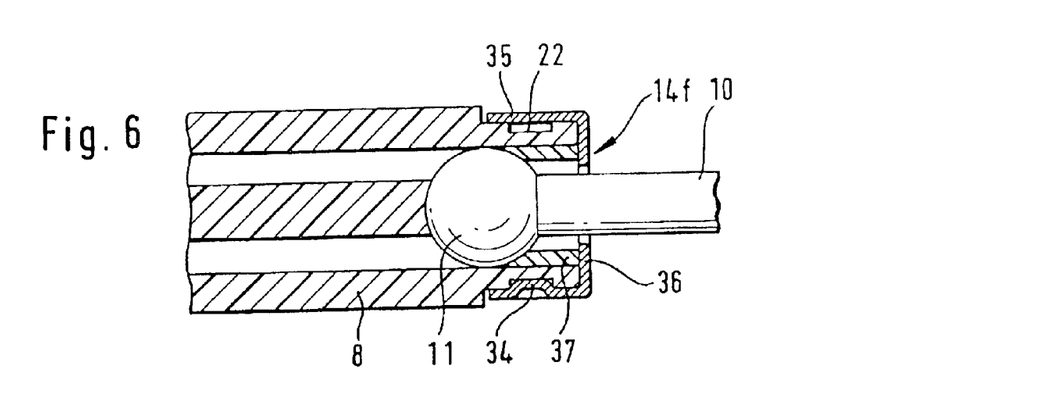
FIG. 6 is a view similar to that of FIG. 5 but showing modified coupling means serving to hold the head of the piston rod in requisite engagement with the internal socket of the piston.

The coupling means 14f of FIG. 6 differs from the couplings means 14e in that its first section 37 is a plastic sleeve which is fitted into the adjacent end of the channel in the piston 8, which reacts against the end wall 36 of the cupped second section 35, and which bears upon the spherical head 11 of the piston rod 10 to thus urge the head against the internal socket of the piston 8.

Figure 7:
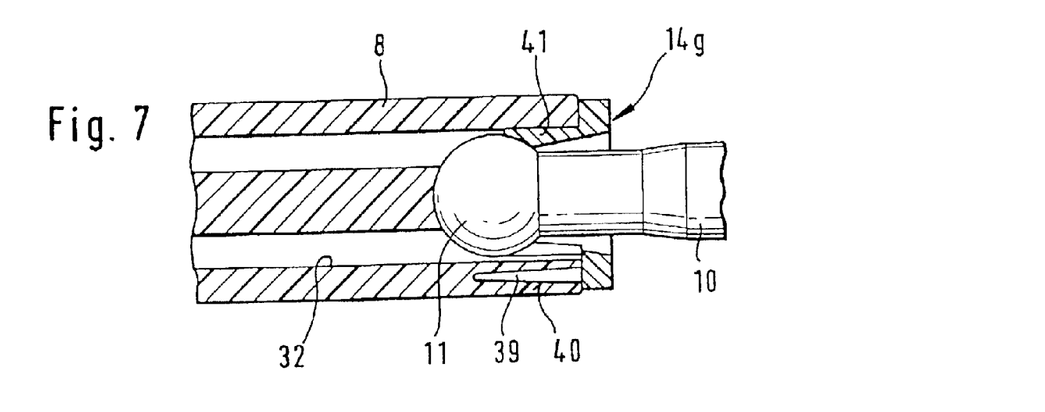
FIG. 7 is a view similar to that of FIG. 5 or 6 but showing one-piece coupling means replacing the composite coupling means of FIGS. 5 and 6.

The master cylinder including the piston 8 and the piston rod 10 of FIG. 7 employs one-piece coupling means 14g made of a plastic material and including a first section 41 fitted into the end portion of the channel 32 and having a concave surface bearing upon the head 11. The second section 39 of the coupling means 14g has a ring-shaped end abutting the end face of the piston 8 and axially parallel studs or prongs or tongues received in complementary recesses 40 provided in the end of the piston. The prongs are or can be of one piece with the aforementioned ring-shaped end of the second section 39.

It is often desirable to permanently secure the second section 39 to the piston 8 of FIG. 7, e.g., by ultrasonic welding or by resorting to a suitable adhesive substance.

Figure 8:
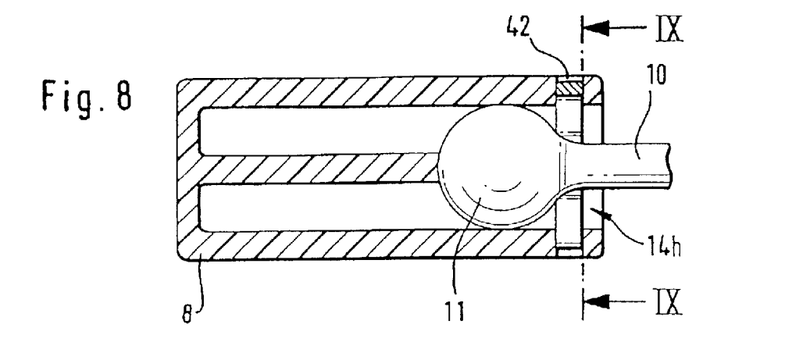
FIG. 8 is a view similar to that of FIG. 5, 6 or 7 but showing coupling means in the form of a clip which is designed to maintain the head of the piston rod in engagement with the internal socket of the piston.
Figure 9:
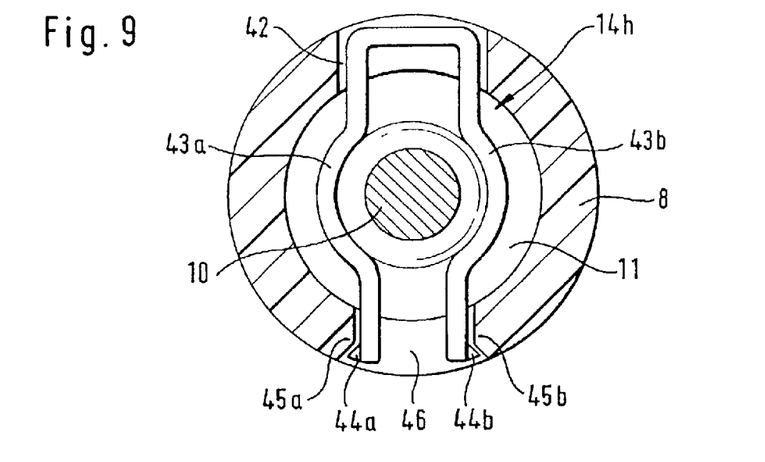
FIG. 9 is an enlarged transverse sectional view as seen in the direction of arrows from the line IX—IX in FIG. 8.

FIGS. 8 and 9 illustrate a piston 8, a piston rod 10 and coupling means 14h serving to separably retain the head 11 of the piston rod in contact with the internal socket of the piston. The coupling means 14h is analogous to the coupling means 14a of FIGS. 1 and 1a because it also comprises a (U-shaped) clip which is held in radially extending slots 42, 46 provided in the hollow end of the piston 8. The coupling means 14h includes two elongated legs or prongs 43a, 43b having arcuate median portions which directly engage the head 11 at its connection or junction with the adjacent part of the piston rod 10, i.e., the legs 43a, 43b constitute the first section of the coupling means 14h. The second section of the coupling means 14h comprises the first and second end portions of the legs 43a, 43b; the first end portions of these legs are integral with a connecting web which also forms part of the second section and is received in the radial recess 42 of the piston 8. The second end portions of the legs 43a, 43b tend to move apart and respectively have lateral extensions 44a, 44b received by snap action in recesses 45a, 45b communicating with the radially extending slot 46 in the respective end of the piston 8.

FIGS. 8 and 9 show that the clip-shaped coupling means 14h extends radially of the end of the piston 8. Such coupling means can be made of metallic wire and its second section (including the web and the extensions 44a, 44b can be assembled with the piston 8 into a module which is ready to receive the head 11 of the piston rod 10.

If it is desired to avoid direct contact between the arcuate median portions of the legs 43a, 43b and the head 11, the coupling means 14h of FIGS. 8 and 9 can further comprise a sleeve-like insert made of a plastic or other suitable material; for example, the coupling means 14h can employ a sleeve-like insert (resembling the plastic sleeve 37 of FIG. 6) which reacts against the arcuate portions of the legs 43a, 43b and bears upon the head 11 of the piston rod 10.

Figure 10:
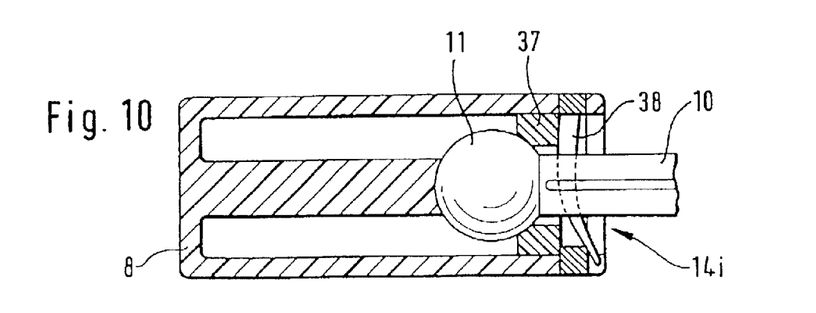
FIG. 10 is a view similar to that of FIG. 8 but showing coupling means in the form of a clip different from that shown in FIGS. 8 and 9.

The coupling means 14i of FIG. 10 employs or is a clip which is made of wire and includes legs 38 constituting the second section of such coupling means. The first section of the coupling means 14i comprises a sleeve 37 which reacts against the section 38 and has a concave annular surface which is urged against the head 11 so that the latter remains in contact with the concave surface of the socket in the piston 8. The dimensions of the coupling means 14i are selected in such a way that the section 37 bears upon the head 11 with a force which holds the head against movement away from the socket or seat in the piston 8, i.e., against movement axially and away from the closed left-hand end of the piston.

Figure 11:
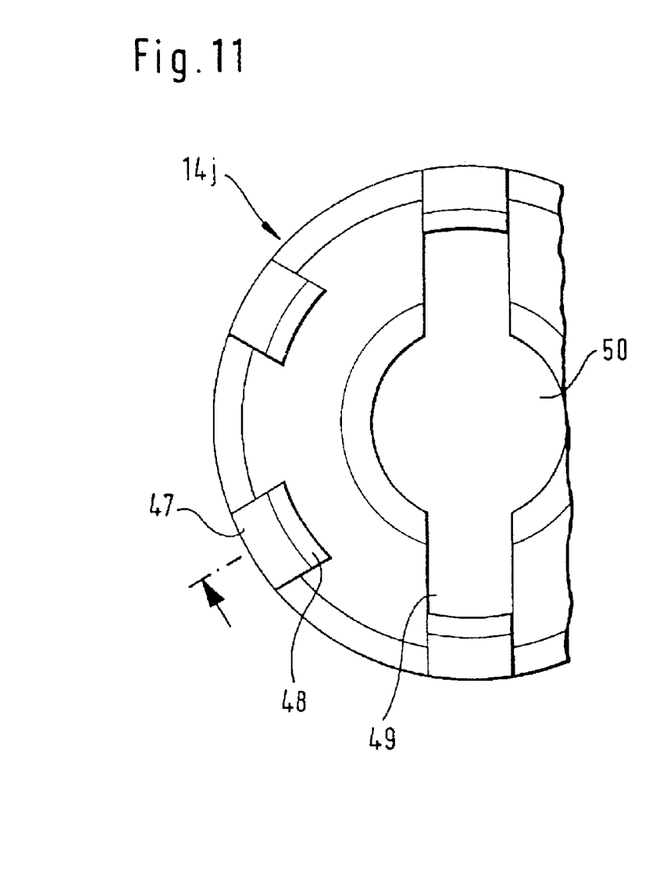
FIG. 11 is a fragmentary front elevational view (as seen from the left-hand side of FIG. 12) of a coupling means wherein the second section is of one piece with the first section and which is made of a plastic material.
Figure 12:
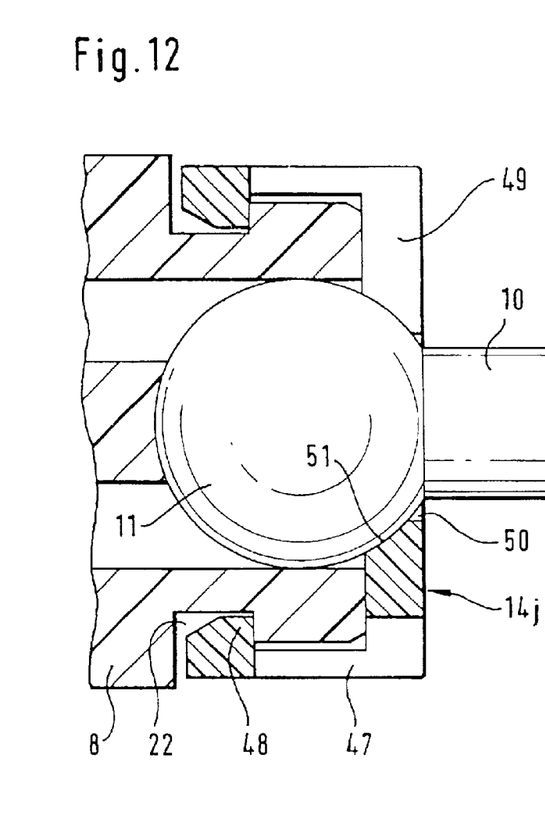
FIG. 12 is a fragmentary axial sectional view of a piston, a fragmentary elevational view of a piston rod, and an axial sectional view of the coupling means of FIG. 11 in a position it assumes while articulately connecting the head of the piston rod to the adjacent end of the piston.

The coupling means 14j of FIGS. 11 and 12 is a one-piece plastic body having a first section 49 with a concave annular surface 51 bearing upon the head 11 of the piston rod 10 so that the head is urged against the socket in the end of the piston 8, and a second section including axially parallel prongs 47 recessed into the peripheral surface of the illustrated end of the piston 8 and having projections 48 received in the external groove 22 of the piston by snap action. The first section 49 can be said to constitute a slotted annular end wall which abuts the end face of the piston 8 and has a central opening 50 for the shank of the piston rod 10, i.e., for that part of the piston rod which is immediately adjacent the head 11.

FIG. 11 shows that the first section 49 of the plastic coupling means 14j comprises six equidistant axially parallel prongs each having a projection 48 engaging, by snap action, a portion of the surface bounding the external groove 32 of the piston 8.

The first section 49 of the coupling means 14j is slotted radially to thus permit a spreading apart of the first section preparatory to introduction of the piston rod 10 into the central opening 50. The slot of the section 49 extends between two prongs of the second section 47. Neighboring projections 48 can be connected to each other.

In assembling the structure of FIGS. 11, 12 into a module, one will assemble the coupling means 14j with the piston rod 10, and the thus obtained first module is thereupon assembled with the piston 8 to form therewith a second module ready to be installed in the housing of a master cylinder. In the assembled condition of the master cylinder embodying the structure of FIGS. 11 and 12, the first section 49 of the coupling means 14j abuts the end face of the piston 8; this ensures that the concave surface 51 abuts the head 11 and the head abuts the internal socket of the piston 8. Assembly of the coupling means 14j with the piston rod 10 involves an opening up of the section 49, i.e., a widening of its radial slot so that the section 49 can be placed around that part of the piston rod which is adjacent the head 11. The section 49 thereupon closes due to its memory and the second section 47 is ready to have its prongs slipped along the external surface of the smaller-diameter end of the piston 8 until the projections 48 snap into the groove 22.

The structure of FIGS. 11 and 12 is particularly suitable for automatic assembly of master cylinders and for automatic installation of such master cylinders in a motor vehicle, e.g., to engage the brakes or to engage a clutch.

Figure 13:
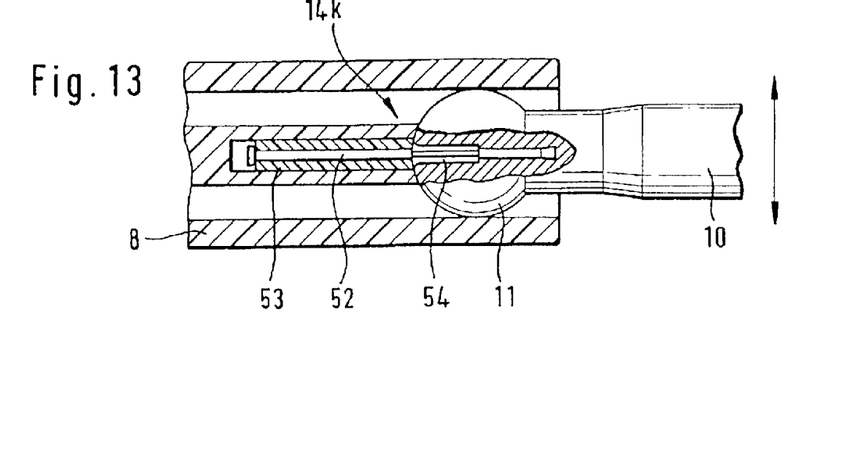
FIG. 13 is a fragmentary axial sectional view of a piston, a fragmentary partly elevational and partly sectional view of a piston rod, and a longitudinal sectional view of a coupling means which resembles an elongated bar and the sections of which are anchored in a centrally located core of the piston and in the head of the piston rod.

FIG. 13 shows a portion of a master cylinder wherein the piston 8 receives the head 11 of the piston rod 10 and wherein the coupling means 14k comprises an elongated flexible rod or bar having a first section 54 anchored in the head 11 and a second section 52 anchored in the space between the tongs 53 of the piston 8. The tongs 53 can constitute the prongs of a longitudinally slotted sleeve or core spacedly surrounded by the cylindrical outer wall of the piston 8. The just discussed core can constitute a separately produced part which is installed in the axial passage or channel of the piston 8, or an integral part of the piston (see 55 in FIG. 14).

The first section 54 of the elongated rod- or bar-shaped coupling means 14k can be permanently anchored in the head 11 of the piston rod 10. In order to ensure that the piston rod 10 can swivel at least in directions indicated by a double-headed arrow, a portion of the first section 54 is received in the head 11 with a certain amount of clearance which suffices to permit all necessary movements of the piston rod 10 and the piston 8 relative to each other.

The structure of FIG. 13 can be employed with advantage in master cylinders which are designed for automatic assembly of their parts. Furthermore, the piston 8 can be readily maintained in a position of exact axial alignment with the piston rod 10; this is desirable for convenient installation of the master cylinder in a motor vehicle. Permanent attachment of the coupling means 14k to the head 11 of the piston rod 10 is optional but often desirable.

Figure 14:
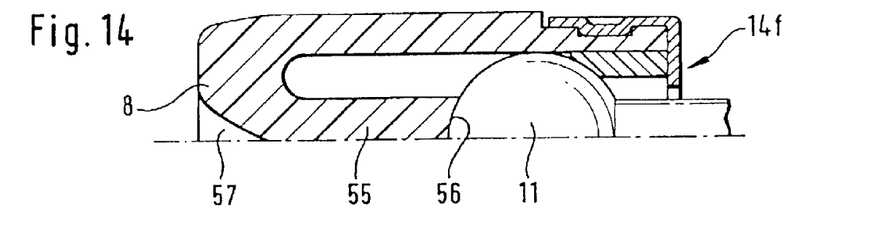
FIG. 14 is a fragmentary axial sectional view of a piston which is made of a plastic material and corresponds to the piston shown in FIG. 6, a fragmentary elevational view of a piston rod, and a fragmentary axial sectional view of coupling means corresponding to that shown in FIG. 6.

FIG. 14 illustrates one presently preferred mode of making the piston 8 from a suitable plastic material, preferably in an injection molding machine and in such a way that the piston can be properly engaged by several types of coupling means, for example, the coupling means shown (at 14f) in FIG. 6. The piston 8 of FIG. 14 is made of a thermosetting material and comprises a centrally located portion or core 55 which can be said to constitute a socket or seat having a concave surface 56 serving as an abutment for the head 11. The funnel-shaped central recess 57 is provided in order to facilitate or simplify the injection molding operation; this recess is adjacent the plenum chamber of the housing which receives the piston 8 of FIG. 14 in the assembled condition of the master cylinder embodying the structure of FIG. 14.

Figure 15:
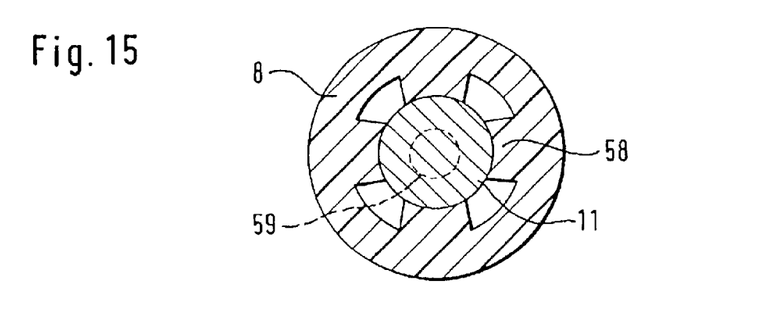
FIG. 15 is a transverse sectional view of a piston rod and a similar sectional view of a piston constituting a modification of the piston shown in FIG. 14.

FIG. 15 shows a piston 8 having internal ribs 58 with integral radially innermost portions which define a ram-like member 59 having a diameter smaller than that of the centrally located core 55 shown in FIG. 14. The member 59 and (if necessary) the ribs 58 have concave surfaces serving as abutments for the head 11 of the piston rod.

The exact configuration of the coupling means depends upon the preferred or desired mode of assembling a complete master cylinder. For example, the coupling means can be designed in such a way (see, e.g., FIG. 4) that the piston 8 and the piston rod 10 can be assembled into a module before the piston is inserted into the housing of the master cylinder. On the other hand, different coupling means can be particularly suited for use as a means for installing the head of a piston rod in the socket of a piston which is already installed in the housing of a master cylinder (see, for example, the coupling means 14b of FIG. 2).

The extent to which a coupling means can be opened up or expanded preparatory to attachment of the piston rod to the piston also depends on the sequence of assembling the parts of a master cylinder and/or upon the selected type of coupling means. For example, the tubular second section 21 of the coupling means 14b should be slotted in order to permit convenient application over the smaller-diameter end of the piston 8 and the penetration of the projection(s) of such second section into the groove 22 of the piston.

The cost can also constitute an important factor in selecting the nature of coupling means to be utilized in the improved master cylinder. For example, a coupling means (such as 14h shown in FIGS. 8 and 9) which constitutes a single piece of suitably shaped wire can be mass-produced at a reasonable cost, and it can be assembled with the parts 8, 10 in a time-saving manner. A coupling means (such as 14h) can be simplified by replacing the legs (43a, 43b) with straight legs which extend tangentially of the piston rod 10, i.e., which are in a mere point contact with the head 11 or with that part of a piston rod 10 which is adjacent the head. The provision of legs (43a, 43b) with arcuate portions which are in linear (rather than mere point) contact with the piston rod is preferred in many instances because this entails a distribution of pressures between the coupling means and the piston rod over a relatively large area of the head 11 and/or over the adjacent part of the piston rod. In other words, the wear upon the piston rod and/or upon the coupling means can be reduced.

The utilization of coupling means (14d) of the type shown in FIG. 4 exhibits the advantage that the master cylinder can employ a very simple and inexpensive piston. Thus, the piston 8 of FIG. 4 must be provided only with an internal socket for the head of the piston rod and with an internal groove (27) for the second section (28) of the coupling means (14d), i.e., the external surface of the piston can constitute a plain cylinder without any grooves, smaller- and larger-diameter portions or the like, and the end face of the piston need not undergo any finishing treatment.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of master cylinders and, therefore, such adaptations should and are intended to be comprehended within the meaning and range of equivalence of the appended claims.

What is claimed is:

1. A master cylinder comprising: a housing defining a chamber; a piston reciprocable in said chamber and having one end containing a socket cavity with an internal diameter; a reciprocable piston rod including a spherical head extending into said socket cavity and having an external diameter substantially equal to said internal diameter; and means for articulately coupling said head to said one end of said piston, including a first section slidably retaining said head in said socket cavity and a second section fixedly seated in a pair of diametrically opposite radial slots arranged at said one end of said piston, wherein said coupling means includes a clip.

2. The master cylinder of claim 1, wherein said clip has two legs flanking said piston rod and bearing upon said head to bias said head into said socket cavity, said second section of said coupling means being anchored in said one end of said piston by snap action.

3. The master cylinder of claim 2, wherein said clip is U-shaped and said legs have arcuate median portions engaging said head and first and second ends, said second section including said first and second ends of said legs and a web connecting the first ends of said legs to each other.

4. The master cylinder of claim 3, wherein said second ends of said legs have extensions received in complementary recesses provided in said one end of said piston.

\* \* \* \* \*